(12) United States Patent
Snede et al.

(10) Patent No.: US 11,591,030 B2
(45) Date of Patent: Feb. 28, 2023

(54) ENDGATE ASSEMBLY AND A VEHICLE THAT UTILIZES THE ENDGATE ASSEMBLY

(71) Applicant: GM GLOBAL TECHNOLOGY OPERATIONS LLC, Detroit, MI (US)

(72) Inventors: Peter M. Snede, Troy, MI (US); Derek L. Patterson, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 151 days.

(21) Appl. No.: 17/107,743

(22) Filed: Nov. 30, 2020

(65) Prior Publication Data
US 2022/0169322 A1   Jun. 2, 2022

(51) Int. Cl.
*B62D 33/037*   (2006.01)
*B60R 3/02*   (2006.01)

(52) U.S. Cl.
CPC .............. *B62D 33/037* (2013.01); *B60R 3/02* (2013.01)

(58) Field of Classification Search
CPC ........ B60R 3/02; B62D 33/027; B62D 33/037
See application file for complete search history.

(56) References Cited

U.S. PATENT DOCUMENTS

| | | | |
|---|---|---|---|
| 9,540,051 B2 * | 1/2017 | Bauer | B60N 2/3095 |
| 2008/0190977 A1 * | 8/2008 | Estabrook | B62D 33/0273 224/535 |
| 2021/0039722 A1 * | 2/2021 | Williamson | B62D 33/03 |

* cited by examiner

*Primary Examiner* — D Glenn Dayoan
*Assistant Examiner* — Melissa Ann Bonifazi
(74) *Attorney, Agent, or Firm* — Quinn IP Law (57) ABSTRACT

An endgate assembly includes a body and a quick-release receptacle. The body includes a first side and a second side opposing each other. The first side of the body defines a compartment accessible from the first side and spaced from the second side. The quick-release receptacle includes a platform. The quick-release receptacle is movable between a stowed position in which the quick-release receptacle is attached to the body within the compartment such that the platform and the first side cooperate to close the compartment, and a detached position in which the quick-release receptacle is released from the body to remove the quick-release receptacle from the compartment. A vehicle includes a cargo area and the endgate assembly as discussed above. The cargo area includes a floor, a first sidewall disposed transverse to the floor, and a second sidewall disposed transverse to the floor. The endgate assembly is coupled to the floor.

20 Claims, 4 Drawing Sheets

ENDGATE ASSEMBLY AND A VEHICLE THAT UTILIZES THE ENDGATE ASSEMBLY

INTRODUCTION

Many trucks are designed with a bed that objects may be loaded into and unload from. The bed may have a tailgate that is movable to open the bed and close the bed to provide easy access to the bed.

SUMMARY

The present disclosure provides an endgate assembly including a body and a quick-release receptacle. The body includes a first side and a second side opposing the first side. The first side of the body defines a compartment accessible from the first side and spaced from the second side. The quick-release receptacle includes a platform. The quick-release receptacle is movable between a stowed position in which the quick-release receptacle is attached to the body within the compartment such that the platform and the first side cooperate to close the compartment, and a detached position in which the quick-release receptacle is released from the body to remove the quick-release receptacle from the compartment.

In certain configurations, the quick-release receptacle includes a frame fixed to the platform, and the frame is concealed inside of the compartment when the quick-release receptacle is in the stowed position.

In certain aspects, the quick-release receptacle includes a first accessory attachable to the frame. The frame includes a retention feature to attach the first accessory to the frame and to detach the first accessory from the frame.

The platform includes an outer side and an inner side opposing the outer side. The outer side of the platform faces in the same direction as the first side of the body. The inner side of the platform faces into the compartment when the quick-release receptacle is in the stowed position.

In one aspect, the frame is fixed to the inner side of the platform. The first accessory is concealed inside of the compartment between the inner side of the platform and the second side of the body.

In various aspects, the quick-release receptacle is further defined as a first quick-release receptacle, and the first quick-release receptacle is configured to retain the first accessory. Furthermore, in certain aspects, a second quick-release receptacle is configured to retain a second accessory. The first quick-release receptacle and the second quick-release receptacle are interchangeably attachable to the body within the compartment.

In certain configurations, the first accessory is different from the second accessory. For example, the first accessory includes a stereo and/or a speaker, and the second accessory includes a tire changing kit and/or a trailer hitch kit. As another example, the first accessory includes a stereo, a speaker, a television stand, or a cooler, and the second accessory includes a toolbox, a cook top, a tool stand, or bed extender bars.

According to further aspects, the body includes a lock assembly configured to lock the quick-release receptacle to the body when the quick-release receptacle is in the stowed position and unlock the quick-release receptacle to allow the quick-release receptacle to move to the detached position. The lock assembly includes a latch disposed inside of the body, and movable between a locked position that engages the quick-release receptacle to retain the quick-release receptacle in the stowed position and an unlocked position spaced from the quick-release receptacle to remove the quick-release receptacle from the compartment in the detached position. In certain configurations, the lock assembly is accessible from first side of the body.

In various configurations, the lock assembly includes an interface accessible from outside of the body such that interaction with the interface causes the latch to move to the locked position or the unlocked position. For example, the interface includes a lock cylinder mechanically coupled to the latch. As another example, the interface includes a switch electrically coupled to the latch.

In various aspects, the quick-release receptacle includes a handle attached to the platform and accessible to relative to the outer side of the platform. In certain configurations, the quick-release receptacle includes a fastening feature that engages the body to retain the quick-release receptacle in the stowed position, and the fastening feature is configured to provide a quick release from the body when the quick-release receptacle moves to the detached position.

In yet further aspects, the platform includes a first edge disposed adjacent to the lock assembly and a second edge opposing the first edge. The handle of the quick-release receptacle is disposed adjacent to the first edge and the fastening feature is disposed along the second edge.

According to further aspects, the body includes a power source accessible from the compartment. The first accessory is attachable to the platform, and the first accessory includes an outlet configured to plug into the power source to operate the first accessory.

The present disclosure also provides a vehicle including a cargo area and the endgate assembly as discussed above. The cargo area includes a floor, a first sidewall disposed transverse to the floor, and a second sidewall disposed transverse to the floor. The first and second sidewalls are spaced apart to define a storage space therebetween. The endgate assembly is coupled to the floor. The endgate assembly is movable between a closed position in which the endgate assembly engages the first sidewall and the second sidewall to close an end of the storage space, and an open position to open the end of the storage space.

In certain aspects, the first side of the body faces the storage space when the endgate assembly is in the closed position. Furthermore, in certain configurations, the quick-release receptacle includes a frame fixed to the platform. The quick-release receptacle includes a first accessory attachable to the frame, and the first accessory is concealed inside of the compartment when the quick-release receptacle is in the stowed position.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
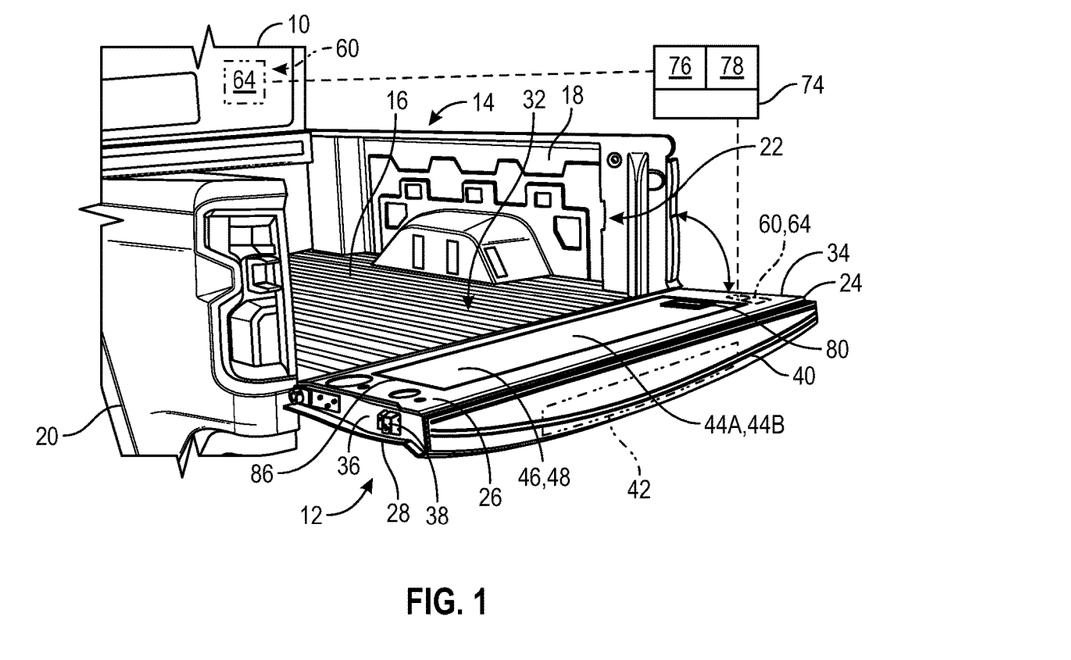
FIG. 1 is a schematic perspective view of a vehicle and an endgate assembly attached to the vehicle as one non-limiting example.

Referring to the FIGS., wherein like numerals indicate like or corresponding parts throughout the several views, a movable platform 10, such as a vehicle is generally shown in FIG. 1, as well as an endgate assembly 12 that may be utilized with the movable platform 10.

Non-limiting examples of the movable platform 10 may include a car, a truck, an off-road vehicle, a farm vehicle, a watercraft, an aircraft, rail vehicles, or any other suitable movable platform. It is to be appreciated that alternatively, a non-movable platform application may be used, such as, farm equipment, stationary platforms, stationary or mobile power plants, robots, conveyors, transport platforms, etc. Therefore, the endgate assembly 12 described herein may be used in movable platform applications or non-movable platform applications. For illustrative purposes, the movable platform 10 of FIG. 1 will be described hereinafter in the context of a motor vehicle without limiting the present teachings to vehicle applications in general.

Continuing with FIG. 1, the vehicle may include a cargo area 14 that various objects or cargo may be movable into and out of the cargo area 14. The cargo area 14 may include a floor 16, a first sidewall 18 disposed transverse to the floor 16, and a second sidewall 20 disposed transverse to the floor 16. Generally, the first and second sidewalls 18, 20 are spaced apart to define a storage space 22 therebetween. Therefore, the various objects may be disposed in the storage space 22 or removed from the storage space 22 as desired.

As best shown in FIG. 1, the endgate assembly 12 may be coupled to the floor 16. In addition to the floor 16, the endgate assembly 12 may be coupled to the first sidewall 18 and the second sidewall 20. Alternatively, the endgate assembly 12 may be coupled to the first sidewall 18 and the second sidewall 20 instead of the floor 16.

Generally, the endgate assembly 12 may be movable relative to the floor 16, the first sidewall 18, and the second sidewall 20, to open and close the storage space 22. That is, the endgate assembly 12 may be movable between a closed position (shown in phantom lines (dash-dot-dot-dash lines) in FIG. 1) in which the endgate assembly 12 engages the first sidewall 18 and the second sidewall 20 to close an end of the storage space 22, and an open position (see FIG. 1) to open the end of the storage space 22. When the endgate assembly 12 is in the open position, the storage space 22 is open to load or unload the various objects, and when the endgate assembly 12 is in the closed position, the storage space 22 is closed to contain the various objects in the storage space 22.

In certain configurations, the endgate assembly 12 may be rotatable relative to the floor 16, the first sidewall 18, and the second sidewall 20. The endgate assembly 12 may be disposed generally parallel to the floor 16 when in the open position, and the endgate assembly 12 may be disposed substantially transverse to the floor 16 when in the closed position.

Figure 2:
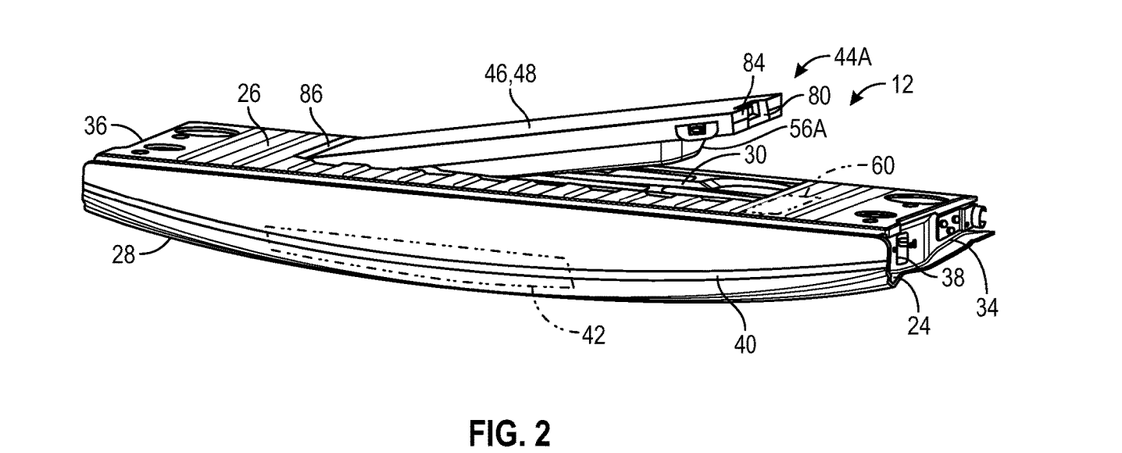
FIG. 2 is a schematic perspective view of the endgate assembly of FIG. 1, with a quick-release receptacle being detached from, or attached to, a body.

Referring to FIGS. 1 and 2, the endgate assembly 12 includes a body 24 that is movable between the open position and the closed position. The body 24 may be referred to as a tailgate in certain configurations, and therefore, the tailgate may move to the open position to open the storage space 22 to load or unload the various objects, and the tailgate may move to the closed position to close the storage space 22 to contain the various objects in the storage space 22.

Figure 3:
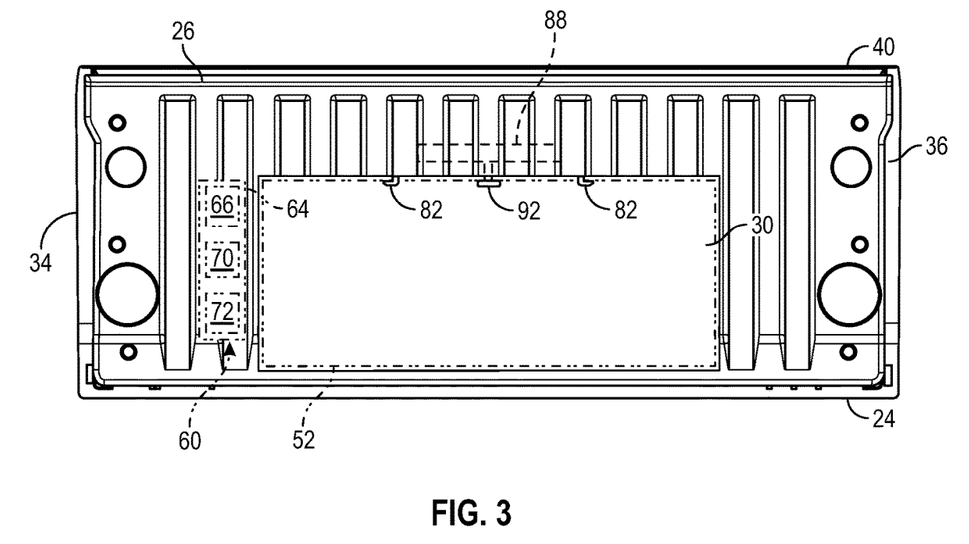
FIG. 3 is a schematic top view of the body with the quick-release receptacle removed to illustrate a compartment of the body.

As best shown in FIGS. 1-3, the body 24 includes a first side 26 and a second side 28 opposing the first side 26. Both of the first side 26 and the second side 28 of the body 24 may be visible from outside of the body 24. The first side 26 of the body 24 defines a compartment 30 (see FIG. 3) accessible from the first side 26 and spaced from the second side 28. Therefore, the compartment 30 is not accessible from the second side 28. Furthermore, the first side 26 of the body 24 faces the storage space 22 when the endgate assembly 12 is in the closed position. When the endgate assembly 12 is in the open position, the first side 26 of the body 24 is generally flush with an outer surface 32 of the floor 16 (see FIG. 1).

In addition, as best shown in FIGS. 1-3, the body 24 may include a first-side edge 34 and a second-side edge 36 opposing the first-side edge 34. The first-side edge 34 and the second-side edge 36 of the body 24 are disposed adjacent to the first side 26 and the second side 28 of the body 24. That is, the first side 26 and the second side 28 of the body 24 may separate the first-side edge 34 and the second-side edge 36 of the body 24. The first-side edge 34 and the second-side edge 36 may each include a latching mechanism 38 that engages the first sidewall 18 and the second sidewall 20 respectively to hold the endgate assembly 12 in the closed position. When the latching mechanism 38 is released, the endgate assembly 12 may move to the open position.

The body 24 may include a distal end 40 disposed between the first-side edge 34 and the second-side edge 36 of the body 24. Furthermore, the distal end 40 may be disposed between the first side 26 and the second side 28 of the body 24. Therefore, the distal end 40 may separate the first-side edge 34 and the second-side edge 36 of the body 24, and also separate the first side 26 and the second side 28 of the body 24.

Optionally, a step apparatus 42 (shown in phantom lines (dash-dot-dot-dash-lines) to represent the optional feature) may be coupled to the body 24 and accessible via the distal end 40. The step apparatus 42 provides a way to enter the storage space 22 of the cargo area 14 when the endgate assembly 12 is in the open position. That is, a user may climb up and down the step apparatus 42 to enter and exit the storage space 22. The step apparatus 42 may be retracted into the body 24 at the distal end 40 when the step apparatus 42 is not in use and extendable out of the body 24 at the distal end 40 when the step apparatus 42 is in use. When the step apparatus 42 is integrated into the body 24, the step apparatus 42 does not interfere with the compartment 30.

Referring to FIGS. 1 and 2, the endgate assembly 12 includes a quick-release receptacle 44A, 44B attachable to the body 24 and releasable from the body 24 as discussed further below. When the step apparatus 42 is integrated into the body 24, the step apparatus 42 does not interfere with the quick-release receptacle 44A, 44B. The quick-release receptacle 44A, 44B provides a way to quickly attach and release the receptacle 44A, 44B to the body 24, in which no additional tools are needed to perform the attachment and detachment of the receptacle 44A, 44B. For example, the quick-release receptacle 44A, 44B may provide latching, clamping or locking components (non-limiting examples of which are discussed below) that allow for quick installation and quick release of the quick-release receptacle 44A, 44B relative to the body 24.

In certain configurations, the quick-release receptacle 44A, 44B is centered in the body 24 relative to the first side 26 which assists balancing additional mass of the quick-release receptacle 44A, 44B in the body 24 as compared to a tailgate that is not designed for the quick-release receptacle 44A, 44B. That is, the body 24 is structurally designed to withstand the additional mass of the quick-release receptacle 44A, 44B in the body 24 as compared to a tailgate that is not designed for the quick-release receptacle 44A, 44B.

Continuing with FIGS. 1 and 2, the quick-release receptacle 44A, 44B includes a platform 46 that is partially visible from outside of the body 24. Generally, the platform 46 includes an outer side 48 and an inner side 50 opposing the outer side 48. As best shown in FIG. 1, the outer side 48 of the platform 46 faces in the same direction as the first side 26 of the body 24. Therefore, the outer side 48 of the platform 46 is visible from outside of the body 24. In certain configurations, the outer side 48 of the platform 46 and the first side 26 of the body 24 may be substantially flush with each other. Optionally, a seal 52 (shown in phantom lines (dash-dot-dot-dash lines) in FIG. 3 to illustrate the optional feature) may be disposed around the platform 46 and/or the compartment 30 to prevent fluid from entering the compartment 30 when the quick-release receptacle 44A, 44B is attached to the body 24.

The quick-release receptacle 44A, 44B is movable between a stowed position (see FIGS. 1 and 5) in which the quick-release receptacle 44A, 44B is attached to the body 24 within the compartment 30 such that the platform 46 and the first side 26 cooperate to close the compartment 30, and a detached position (see FIGS. 2, 4, and 6-8) in which the quick-release receptacle is released from the body 24 to remove the quick-release receptacle from the compartment 30. The inner side 50 of the platform 46 faces into the compartment 30 when the quick-release receptacle 44A, 44B is in the stowed position (see FIG. 2). Generally, the quick-release receptacle 44A, 44B is more accessible when the endgate assembly 12 is in the open position, and therefore, attaching and detaching the quick-release receptacle 44A, 44B from the compartment 30 may occur when the endgate assembly 12 is disposed in the open position.

Figure 6:
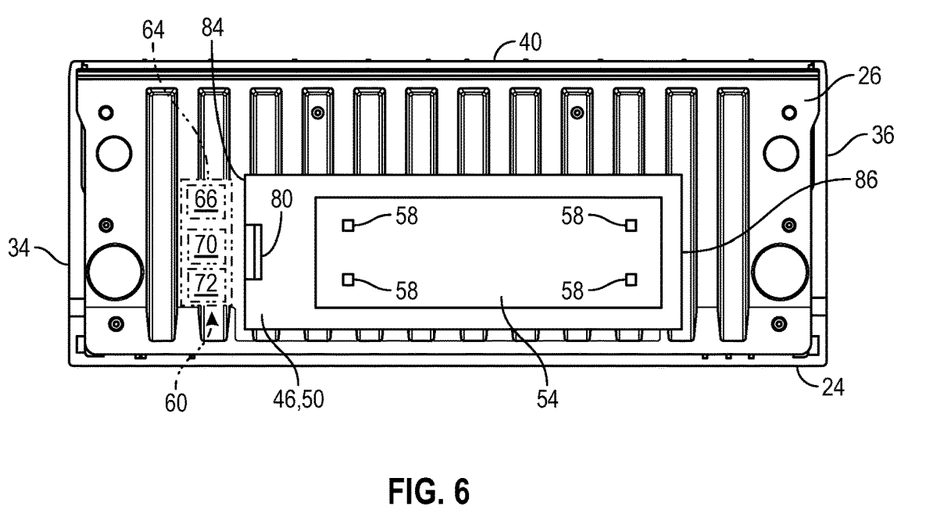
FIG. 6 is a schematic top view of the endgate assembly, with the quick-release receptacle turned over as compared to the orientation of FIG. 1, and an accessory of the quick-release receptacle removed to illustrate a frame of the quick-release receptacle.

Referring to FIG. 6, the quick-release receptacle 44A, 44B may include a frame 54 fixed to the platform 46. More specifically, in certain configurations, the frame 54 is fixed to the inner side 50 of the platform 46. The frame 54 is concealed inside of the compartment 30 when the quick-release receptacle 44A, 44B is in the stowed position. FIG. 6 is a generic illustration of the frame 54, and it is to be appreciated that the frame 54 is customized to the configuration of an accessory 56A, 56B being attached thereto.

The quick-release receptacle 44A, 44B may include a first accessory 56A (see FIG. 2) attachable to the platform 46, and more specifically, in certain configurations, attachable to the frame 54. Generally, the first accessory 56A is concealed inside of the compartment 30 when the quick-release receptacle 44A, 44B is in the stowed position. More specifically, the first accessory 56A is concealed inside of the compartment 30 between the inner side 50 of the platform 46 and the second side 28 of the body 24 when the quick-release receptacle 44A, 44B is in the stowed position. Therefore, the quick-release receptacle 44A, 44B provides a way to carry various objects or items inside of the body 24 that do not take up space in the storage space 22.

The configuration of the frame 54 may be designed to accommodate the configuration of the first accessory 56A. Therefore, the frame 54 may be any suitable configuration to secure the first accessory 56A to the platform 46. Furthermore, as best shown in FIG. 6, the frame 54 may include a retention feature 58 to attach the first accessory 56A to the frame 54 and to detach the first accessory 56A from the frame 54. The retention feature 58 may be any suitable configuration to accommodate the configuration of the first accessory 56A. In addition, any suitable number of retention features 58 may be utilized. That is, one or more retention feature(s) 58 may be supported via the frame 54 and engage the first accessory 56A to attach the first accessory 56A to the frame 54. Optionally, if the frame 54 is eliminated, the retention feature(s) 58 may be attached to the inner side 50 of the platform 46 to attach the first accessory 56A to the platform 46 and to detach the first accessory 56A from the platform 46.

Figure 7:
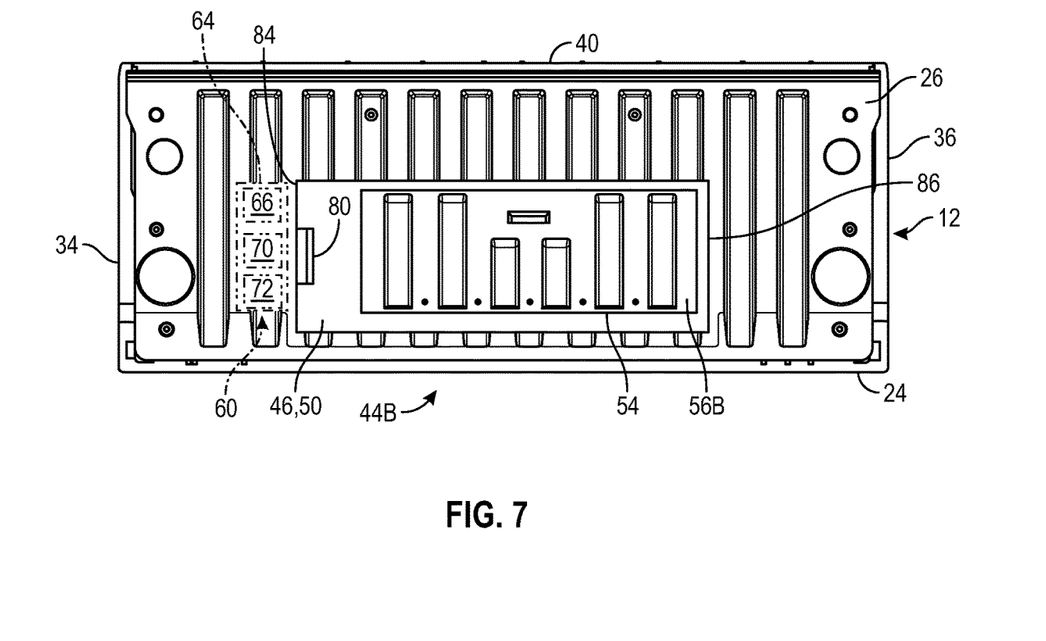
FIG. 7 is a schematic top view of the endgate assembly, with the quick-release receptacle disposed in the same orientation as FIG. 6, and the accessory illustrated attached to the frame.
Figure 8:
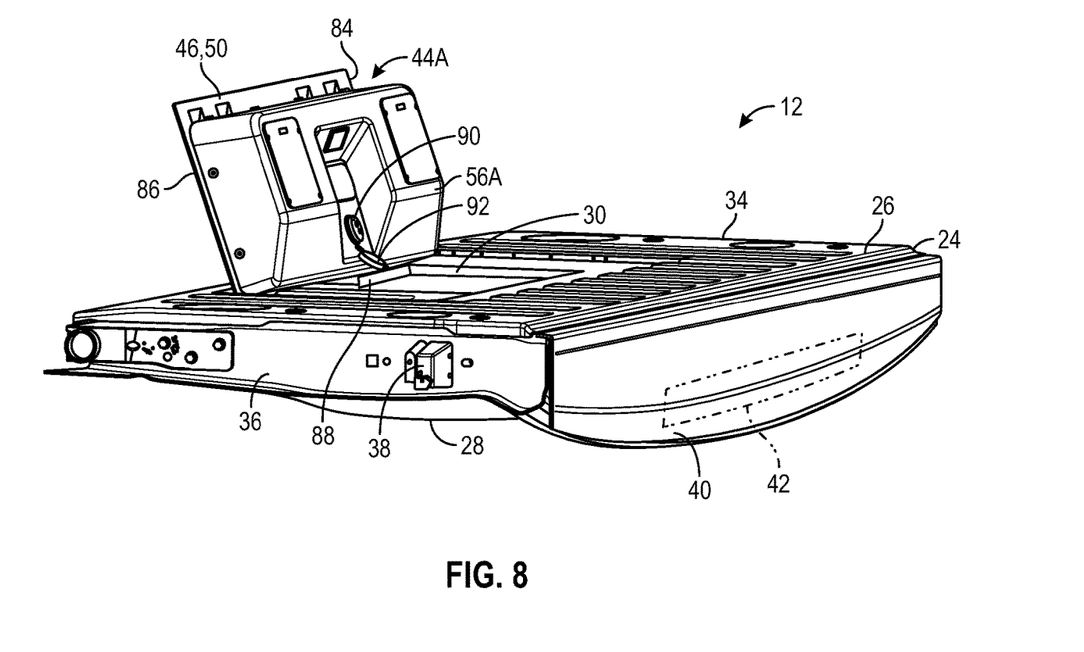
FIG. 8 is a schematic perspective view of the endgate assembly, with the quick-release receptacle flipped up to illustrate one example of the first accessory as a speaker which may optionally include a stereo.

In certain configurations, the user may interchange the quick-release receptacle 44A, 44B with other quick-release receptacles 44A, 44B, which provides additional usages or options that cater to the user's desires. Therefore, for example, the quick-release receptacle 44A, 44B may be further defined as a first quick-release receptacle 44A that is configured to retain the first accessory 56A, and the endgate assembly 12 may further include a second quick-release receptacle 44B configured to retain a second accessory 56B (compare FIGS. 2 and 8). The first quick-release receptacle 44A and the second quick-release receptacle 44B are interchangeably attachable to the body 24 within the compartment 30. Therefore, the user may quickly and easily swap the receptacles 44A, 44B so that the user may customize the accessories 56A, 56B. It is to be appreciated that the second quick-release receptacle 44B may include the frame 54 as discussed above, with the frame 54 being configured to accommodate the second accessory 56B. FIG. 7 is a generic illustration of one of the accessories 56A, 56B, which could be the first accessory 56A or the second accessory 56B, etc.

Generally, the first accessory 56A is different from the second accessory 56B. Therefore, the user may swap out of the compartment 30 one quick-release receptacle 44A for another quick-release receptacle 44B depending on the desires of the user. As one non-limiting example, the first accessory 56A may include a stereo and/or a speaker, and the second accessory 56B may include a tire changing kit and/or a trailer hitch kit. As yet other non-limiting examples, the first accessory 56A may include a stereo, a speaker, a television stand, or a cooler, and the second accessory 56B may include a toolbox, a cook top, a tool stand, or bed extender bars. It is to be appreciated that the first accessory 56A and the second accessory 56B may be other objects or items, and other non-limiting examples of the first accessory 56A or the second accessory 56B may include one or more handle(s), step assist, storage bin(s), tool(s), load stop, etc. For illustrative purposes, FIG. 8 generally illustrates the speaker, which could optionally include the stereo in this figure.

Figure 5:
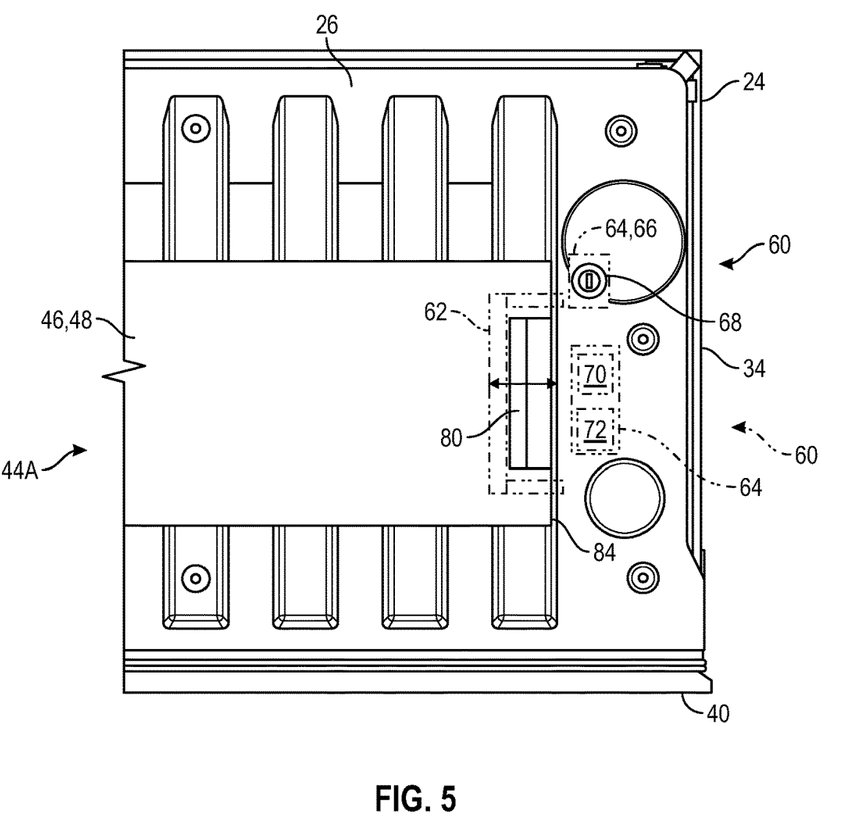
FIG. 5 is a schematic fragmentary top view of another end of the quick-release receptacle illustrating a handle and an interface disposed in the body.

Referring to FIG. 5, the body 24 may include a lock assembly 60 configured to lock the quick-release receptacle 44A, 44B to the body 24 when the quick-release receptacle 44A, 44B is in the stowed position and unlock the quick-release receptacle 44A, 44B to allow the quick-release receptacle 44A, 44B to move to the detached position. That is, the lock assembly 60 may provide a security feature that prevents an unauthorized taking of the quick-release receptacle 44A, 44B. In certain configurations, the lock assembly 60 is accessible from the first side 26 of the body 24. That is, the lock assembly 60 may be activated from the body 24. In other configurations, the lock assembly 60 is activated from inside of a passenger compartment of the movable platform 10, such as the motor vehicle. The lock assembly 60 may be any suitable configuration, and may be activated manually or electronically, or any other suitable way to be activated.

The lock assembly 60 may include one or more components to lock and unlock the quick-release receptacle 44A, 44B relative to the body 24. More specifically, turning to FIG. 5, generally, the lock assembly 60 may include a latch 62 disposed inside of the body 24. The latch 62 is movable between a locked position that engages the quick-release receptacle 44A, 44B to retain the quick-release receptacle 44A, 44B in the stowed position and an unlocked position spaced from the quick-release receptacle 44A, 44B to remove the quick-release receptacle 44A, 44B from the compartment 30 in the detached position. For example, the latch 62 is shown in phantom lines (dash-dot-dot-dash lines) in FIG. 5, which may slide back and forth under the first side 26 of the body 24 to lock and unlock the quick-release receptacle 44A, 44B.

Referring to FIGS. 1 and 5, the lock assembly 60 may include an interface 64 accessible from outside of the body 24 such that interaction with the interface 64 causes the latch 62 to move to the locked position or the unlocked position. That is, the interface 64 may be accessible from inside of the passenger compartment 30 which is outside of the body 24, or accessible from the first side 26 or the second side 28 of the body 24 that is visible outside of the body 24. Optionally, when the interface 64 is attached to the body 24, a cover may be used to selectively conceal the interface 64.

The interface 64 may be any suitable configuration, and some non-limiting examples are discussed next. For example, the interface 64 may include a lock cylinder 66 mechanically coupled to the latch 62. In this example, the lock cylinder 66 may be disposed in the body 24, and the lock cylinder 66 may include a key face 68 (see FIG. 5) in which a key is inserted into the key face 68 and turned to move the latch 62 to unlock the quick-release receptacle 44A, 44B.

As another example, the interface 64 may include a switch 70 electrically coupled to the latch 62. In this example, the switch 70 may be disposed inside of the passenger compartment 30, and the user presses, turns, flips, etc., the switch 70 which is in electrical communication with a device, a motor, a solenoid, etc., to move the latch 62 to unlock the quick-release receptacle 44A, 44B.

As yet another example, the interface 64 may include a touch pad 72. In this example, the touch pad 72 is electrically coupled to the latch 62. Continuing with this example, the touch pad 72 may be disposed inside of the passenger compartment 30 or attached to the body 24, and the touch pad 72 is in electrical communication with a device, a motor, a solenoid, etc., to move the latch 62 to unlock the quick-release receptacle 44A, 44B. The touch pad 72 may include buttons having numbers or letters thereon, a finger-print pad, etc. When the touch pad 72 uses the buttons, the user may press the buttons in a certain code or pattern which causes the latch 62 to move to the unlocked position. When the touch pad 72 uses the finger-print pad, the user may position a finger of the user's relative to the pad which causes the latch 62 to move to the unlocked position.

A controller 74 (see FIG. 1) may be in electrical communication with the lock assembly 60. In certain configurations, the controller 74 is in electrical communication with the lock assembly 60, and more specifically the interface 64 to control the movement of the latch 62 to lock and unlock the quick-release receptacle 44A, 44B. Therefore, for example, the controller 74 may control when the latch 62 moves to the locked position and the unlocked position. Instructions may be stored in a memory 76 of the controller 74 and automatically executed via a processor 78 of the controller 74 to provide the respective control functionality. The controller 74 is configured to execute the instructions from the memory 76, via the processor 78. For example, the controller 74 may be a host machine or distributed system, e.g., a computer such as a digital computer or microcomputer, and, as the memory 76, tangible, non-transitory computer-readable memory such as read-only memory (ROM) or flash memory. The controller 74 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 74 may include all software, hardware, memory 76, algorithms, connections, sensors, etc., necessary to control, for example, the lock assembly 60. As such, a control method operative to control the lock assembly 60 may be embodied as software or firmware associated with the controller 74. It is to be appreciated that the controller 74 may also include any device capable of analyzing data from various sensors, comparing data, making the necessary decisions required to control and/or monitor the lock assembly 60. Optionally, more than one controller 74 may be utilized.

Generally, the quick-release receptacle 44A, 44B may have a way to grasp the receptacle 44A, 44B. Therefore, as best shown in FIG. 5, the quick-release receptacle 44A, 44B may include a handle 80 attached to the platform 46 and accessible to relative to the outer side 48 of the platform 46. The handle 80 may be recessed into the outer side 48 of the platform 46 when the handle 80 is not in use. Therefore, for example, the handle 80 may be designed to not protrude outwardly from the outer side 48 of the platform 46, and thus provides a flush exterior appearance. The handle 80 may be movable relative to the platform 46 to extend beyond the platform 46 to provide easy access to move the quick-release receptacle 44A, 44B. Alternatively, the handle 80 may remain stationary relative to the platform 46, and for example, may define a pocket grip in which the user's fingers may extend into to provide easy access to move the quick-release receptacle 44A, 44B. Furthermore, the handle 80 may be accessible from both of the outer side 48 of the platform 46 and the inner side 50 of the platform 46.

Figure 4:
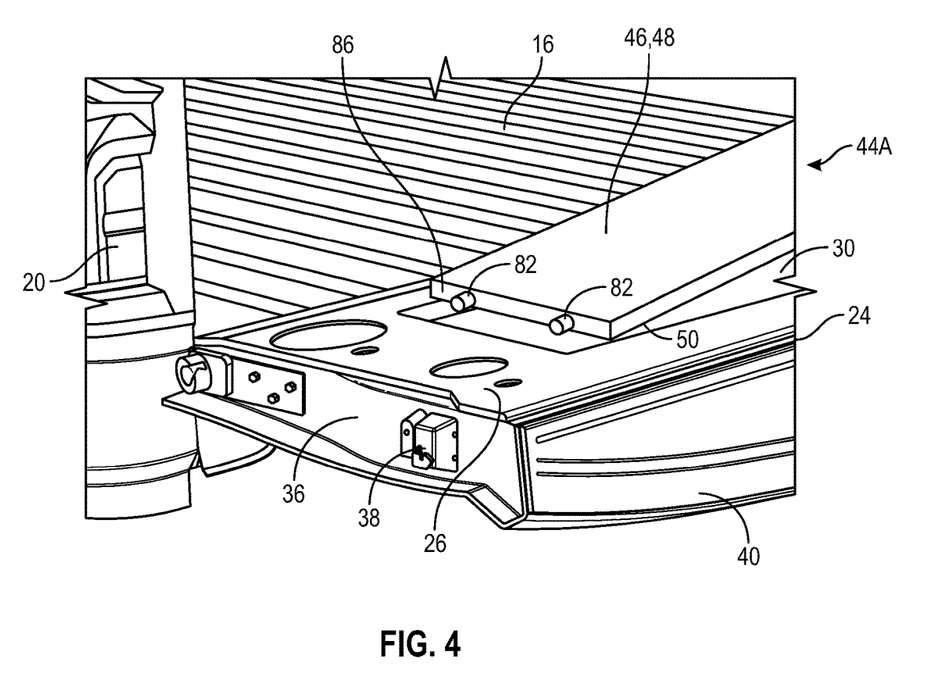
FIG. 4 is a schematic fragmentary perspective view of one end of the quick-release receptacle being removed from, or attached to, the compartment of the body.

The platform 46 and/or the body 24 may include one or more features 58, 82 to retain the quick-release receptacle 44A, 44B to the body 24 when in the stowed position. For example, as best shown in FIG. 4, the quick-release receptacle 44A, 44B may include a fastening feature 82 that engages the body 24 to retain the quick-release receptacle 44A, 44B in the stowed position. Generally, the fastening feature 82 is configured to provide a quick release from the body 24 when the quick-release receptacle 44A, 44B moves to the detached position. In certain configurations, the fastening feature 82 may protrude from the platform 46, and the fastening feature 82 may be inserted into the compartment 30 such that the fastening feature 82 and the first side 26 of the body 24 overlap each other. In other configurations, the fastening feature 82 protrudes from the body 24 into the compartment 30, and another fastening feature 82 is recessed into the platform 46 to engage the fastening feature 82 of the body 24. Therefore, as non-limiting examples, the fastening feature 82 of the platform 46 and/or the body 24 may include one or more of protrusion(s), tab(s), finger(s), pin(s), post(s), loop(s), hook(s), eyelet(s), slot(s), groove(s), pocket(s), or any other suitable feature to retain the quick-release receptacle 44A, 44B in the stowed position. Any suitable number of fastening features 82 may be used.

As another example, the fastening feature 82 may include a quarter-turn deck plate that is accessible from the outer side 48 of the platform 46 and/or the first side 26 of the body 24. In this example, part of the quarter-turn deck plate is rotatable via one or more grips to engage or disengage from one or more tabs of the quarter-turn deck plate. The tab(s) may be fixed to the body 24 and the rotatable part may be secured to the quick-release receptacle 44A, 44B, or vice versa.

Turning to FIGS. 1, 2, 4, and 5, the platform 46 may include a first edge 84 disposed adjacent to the lock assembly 60 and a second edge 86 opposing the first edge 84. In certain configurations, the handle 80 and the fastening feature 82 of the platform 46 may be disposed proximal to opposite edges 84, 86 of the platform 46. For example, the handle 80 of the quick-release receptacle 44A, 44B may be disposed adjacent to the first edge 84 and the fastening feature 82 may be disposed along the second edge 86. Therefore, one non-limiting way to quickly remove the quick-release receptacle 44A, 44B from the compartment 30, when the latch 62 is in the unlocked position, is to lift the platform 46 at the first edge 84 via the handle 80 to tilt the platform 46 (as shown in FIGS. 2 and 4), and then pull the quick-release receptacle 44A, 44B away from the compartment 30 such that the fastening feature 82 of the platform 46 and/or the body 24 release (as shown in FIG. 4). When the user is ready to reattach the quick-release receptacle 44A, 44B to the body 24, the quick-release receptacle 44A, 44B may be quickly reattached by tilting the platform 46 (as shown in FIGS. 2 and 4) and inserting the fastening feature 82 into the compartment 30 at the second edge 86, and then rotating the first edge 84 of the platform 46 into engagement with the body 24 such that the latch 62 snaps the quick-release receptacle 44A, 44B into place at the first edge 84. It is to be appreciated that the fastening feature 82 and the handle 80 may be in other locations than what is illustrated.

Optionally, power may be supplied to one of the accessories 56A, 56B. Therefore, in certain configurations, the body 24 may include a power source 88 (see FIG. 3) accessible from the compartment 30. By providing the power source 88 to various accessories 56A, 56B, this provides the user with additional versatility of the accessories 56A, 56B. The power source 88 is hidden inside of the compartment 30 when the quick-release receptacle 44A, 44B is in the stowed position. That is, the power source 88 is not visible from outside of the body 24 when the quick-release receptacle 44A, 44B is in the stowed position. In certain configurations, the power source 88 provides electrical power such as an alternating current (AC). It is to be appreciated that any suitable power may be supplied to the accessories 56A, 56B.

Furthermore, the first accessory 56A may include an outlet 90 configured to plug into the power source 88 to operate the first accessory 56A. As such, the power source 88 may provide power to the first accessory 56A when the power source 88 is plugged into the outlet 90. Therefore, any accessory 56A, 56B that utilizes power, such as the television, the stereo, the speaker, an electric cook top, etc., may be plugged into the power source 88 via the outlet 90. The power source 88 may include a cord 92 or a wire harness that is stored inside of the compartment 30, and the cord 92 is plugged into the outlet 90 to supply the power. It is to be appreciated that the second accessory 56B or any other accessory may include the outlet 90 as discussed above.

Generally, when the quick-release receptacle 44A, 44B is in the detached position and released from the compartment 30, the first accessory 56A may be flipped over such that the outer side 48 of the platform 46 rests on the first side 26 of the body 24, rest in the compartment 30, rest on the floor 16 of the cargo area 14, or any other suitable location. The first accessory 56A may be plugged into the power source 88 when the quick-release receptacle 44A, 44B is in the detached position, such as when the first accessory 56A is flipped over and released from the compartment 30.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:
1. An endgate assembly comprising:
a body including a first side and a second side opposing the first side, and the first side of the body defines a compartment accessible from the first side and spaced from the second side;
a quick-release receptacle including a platform, and the quick-release receptacle is movable between a stowed position in which the quick-release receptacle is attached to the body within the compartment such that the platform and the first side cooperate to close the compartment, and a detached position in which the quick-release receptacle is released from the body to remove the quick-release receptacle from the compartment;

wherein the platform includes an outer side that faces in the same direction as the first side of the body when the quick-release receptacle is in the stowed position; and wherein the quick-release receptacle includes a handle that is recessed into the outer side of the platform and accessible relative to the outer side of the platform when the quick-release receptacle is in the stowed position.

2. The endgate assembly as set forth in claim 1 wherein the quick-release receptacle includes a frame fixed to the platform, and the frame is concealed inside of the compartment when the quick-release receptacle is in the stowed position.

3. The endgate assembly as set forth in claim 2 wherein the quick-release receptacle includes a first accessory attachable to the frame.

4. The endgate assembly as set forth in claim 3 wherein the frame includes a retention feature to attach the first accessory to the frame and to detach the first accessory from the frame.

5. The endgate assembly as set forth in claim 2 wherein:
the platform includes an inner side opposing the outer side;
the inner side of the platform faces into the compartment when the quick-release receptacle is in the stowed position; and
the frame is fixed to the inner side of the platform.

6. The endgate assembly as set forth in claim 5 wherein the quick-release receptacle includes a first accessory attachable to the frame, and the first accessory is concealed inside of the compartment between the inner side of the platform and the second side of the body when the quick-release receptacle is in the stowed position.

7. The endgate assembly as set forth in claim 1:
wherein the quick-release receptacle is further defined as a first quick-release receptacle;
wherein the first quick-release receptacle is configured to retain a first accessory;
further including a second quick-release receptacle configured to retain a second accessory; and
wherein the first quick-release receptacle and the second quick-release receptacle are interchangeably attachable to the body within the compartment.

8. The endgate assembly as set forth in claim 7 wherein:
the first accessory is different from the second accessory;
the first accessory includes a stereo and/or a speaker; and
the second accessory includes a tire changing kit and/or a trailer hitch kit.

9. The endgate assembly as set forth in claim 7 wherein:
the first accessory is different from the second accessory;
the first accessory includes a stereo, a speaker, a television stand, or a cooler; and
the second accessory includes a toolbox, a cook top, a tool stand, or bed extender bars.

10. The endgate assembly as set forth in claim 1 wherein the body includes a lock assembly configured to lock the quick-release receptacle to the body when the quick-release receptacle is in the stowed position and unlock the quick-release receptacle to allow the quick-release receptacle to move to the detached position.

11. The endgate assembly as set forth in claim 10 wherein the lock assembly includes a latch disposed inside of the body, and movable between a locked position that engages the quick-release receptacle to retain the quick-release receptacle in the stowed position and an unlocked position spaced from the quick-release receptacle to remove the quick-release receptacle from the compartment in the detached position.

12. The endgate assembly as set forth in claim 11 wherein the lock assembly includes an interface accessible from outside of the body such that interaction with the interface causes the latch to move to the locked position or the unlocked position.

13. The endgate assembly as set forth in claim 12 wherein the interface includes a lock cylinder mechanically coupled to the latch.

14. The endgate assembly as set forth in claim 12 wherein the interface includes a switch electrically coupled to the latch.

15. The endgate assembly as set forth in claim 1 wherein the quick-release receptacle includes a fastening feature that engages the body to retain the quick-release receptacle in the stowed position, and the fastening feature is configured to provide a quick release from the body when the quick-release receptacle moves to the detached position.

16. The endgate assembly as set forth in claim 15 wherein:
the body includes a lock assembly accessible from first side of the body, and the lock assembly is configured to lock the quick-release receptacle to the body when the quick-release receptacle is in the stowed position and unlock the quick-release receptacle to allow the quick-release receptacle to move to the detached position;
the platform includes a first edge disposed adjacent to the lock assembly and a second edge opposing the first edge; and
the handle of the quick-release receptacle is disposed adjacent to the first edge and the fastening feature is disposed along the second edge.

17. The endgate assembly as set forth in claim 1 wherein:
the body includes a power source accessible from the compartment;
the quick-release receptacle includes a first accessory attachable to the platform; and
the first accessory includes an outlet configured to plug into the power source to operate the first accessory.

18. A vehicle comprising:
a cargo area including a floor, a first sidewall disposed transverse to the floor, and a second sidewall disposed transverse to the floor, with the first and second sidewalls spaced apart to define a storage space therebetween;
an endgate assembly coupled to the floor, and the endgate assembly is movable between a closed position in which the endgate assembly engages the first sidewall and the second sidewall to close an end of the storage space, and an open position to open the end of the storage space;
wherein the endgate assembly includes:
a body including a first side and a second side opposing the first side, and the first side of the body defines a compartment accessible from the first side and spaced from the second side; and
a quick-release receptacle including a platform, and the quick-release receptacle is movable between a stowed position in which the quick-release receptacle is attached to the body within the compartment such that the platform and the first side cooperate to close the compartment, and a detached position in which the quick-release receptacle is released from the body to remove the quick-release receptacle from the compartment; and wherein the platform includes an outer side that is substantially flush with the first side of the body when the quick-release receptacle is in the stowed position.

19. The vehicle as set forth in claim 18 wherein:

the first side of the body faces the storage space when the endgate assembly is in the closed position;

the quick-release receptacle includes a frame fixed to the platform; and the quick-release receptacle includes a first accessory attachable to the frame, and the first accessory is concealed inside of the compartment when the quick-release receptacle is in the stowed position.

20. An endgate assembly comprising:

a body including a first side and a second side opposing the first side, and the first side of the body defines a compartment accessible from the first side and spaced from the second side;

a quick-release receptacle including a platform, and the quick-release receptacle is movable between a stowed position in which the quick-release receptacle is attached to the body within the compartment such that the platform and the first side cooperate to close the compartment, and a detached position in which the quick-release receptable is released from the body to remove the quick-release receptacle from the compartment; and wherein the quick-release receptacle includes a first accessory coupled to the platform and the first accessory protrudes outwardly away from the platform, and wherein the first accessory is concealed inside of the compartment when the quick-release receptacle is in the stowed position.

* * * * *